United States Patent [19]

Hayashi

[11] Patent Number: 4,806,087

[45] Date of Patent: Feb. 21, 1989

[54] APPARATUS FOR PRODUCING COMPOSITE FOOD HAVING A CONTROLLED COMPOSITION OF MATERIALS

[75] Inventor: Torahiko Hayashi, Utsunomiya, Japan

[73] Assignee: Rheon Automatic Machinery Co., Ltd., Japan

[21] Appl. No.: 79,880

[22] Filed: Jul. 30, 1987

[30] Foreign Application Priority Data

Jul. 30, 1986 [JP] Japan ............................ 61-179259

[51] Int. Cl.$^4$ ........................................... B29C 47/92
[52] U.S. Cl. ................................. 425/130; 99/450.6;
    99/450.1; 264/40.4; 425/131.1; 425/133.5;
    425/140; 425/148; 426/231; 426/502; 426/516
[58] Field of Search ............ 425/130, 131.1, 133.5,
    425/136, 140, 148, 145, 238; 99/450.1, 450.6,
    450.7; 366/18, 141, 152, 160, 161; 426/231, 502,
    516, 517; 264/40.4

[56] References Cited

U.S. PATENT DOCUMENTS

| 2,664,557 | 12/1953 | Sargrove | 425/148 |
| 2,927,542 | 3/1960 | Moser | 425/131.1 |
| 4,583,930 | 4/1986 | Hayashi | 425/148 |
| 4,692,107 | 9/1987 | Morikawa et al. | 425/140 |

Primary Examiner—Jay H. Woo
Assistant Examiner—Timothy W. Heitbrink
Attorney, Agent, or Firm—Guy W. Shoup; Paul J. Winters; Thomas S. MacDonald

[57] ABSTRACT

An apparatus for producing composite food having a controlled composition is provided. In this apparatus, a plurality of supply means (3, 11) for supplying materials, a conveyor (7) for conveying the materials, a plurality of measuring devices (5, 13) at each of the supply means (3, 11) and a selecting device (17) for eliminating poor products are provided, and the materials are put together on the conveyor (7) resulting in a composite food mass.

The quantity of each material per unit time is measured by the measuring means (5, 13), and ratios of the materials of the composite food mass are computed based on the quantity data. When the portions are cut into separate products, poor products are removed by the selecting means (17) based on the data from the comparison of the ratios of the materials of each portion with the reference ratios.

10 Claims, 7 Drawing Sheets

APPARATUS FOR PRODUCING COMPOSITE FOOD HAVING A CONTROLLED COMPOSITION OF MATERIALS

BACKGROUND OF THE INVENTION

This invention relates to an apparatus for producing composite food, which is produced by combining or wrapping food materials of different types, such as bread dough with cheese, jam, or the like, which are constituents of Danish pastries, apple pies, pizza pies, etc. More particularly, this invention relates to an apparatus for producing composite food having a controlled composition of various kinds of materials by determining the quantity and percentage of each portion of the materials to be later combined to form composite food.

DESCRIPTION OF PRIOR ART

In the production of so-called composite foods, as in, for example, bean-jam buns, apple pies, Danish pastries, pizza pies, and the like, prepared by shaping and cooking a combination of a plurality of various kinds of materials, the quality, especially, the taste, of the finished composite food is determined not only by the quantities of the individual materials constituting the food, but also by the ratio of the various materials used. This ratio is a very important factor governing the taste of the composite food.

In the past, when composite foods were produced using automatic machines, only the quantity of each of the materials to form a composite food has been measured, but the measurement regarding each food material has not been used in determining the quality or taste of the finished composite food.

Further, in general composite foods are produce by putting materials through many steps. Since these materials are incorporated into a mass of composite food, there is no effective way to determine the ratios of the constituent materials. Thus merely the total weight of each unit of the composite food has been measured to determine whether the quality of the product is acceptable or not.

That is, there has been no means for controlling the taste of composite food in the process of automatic production.

For example, apply pies are produced by a method comprising the steps of continuously supplying pin dough, continuously stretching this dough, continuously or intermittently supplying apple jam onto the stretched pie dough, wrapping the apple jam with the pie dough, cutting the pie dough, and wrapping the jam into separate apple pies. Due to the viscosity of food materials, they cannot be supplied at a constant rate throughout the operation. Accordingly, when such food materials are processed on automatic machines, the quality or the taste of the end product is not uniform, resulting in poor products. Furthermore, if there is any trouble in feeding materials, such as clogging or supply shortages, the apparatus of the prior art cannot detect poor products and the continues to produce poor products.

SUMMARY OF THE INVENTION

It is therefore an object of the present invention to overcome the disadvantage of the conventional method described above and to provide an apparatus for producing pieces of composite food having the same quality and taste by controlling the composition of the materials constituting the composite food.

It is another object of the present invention to provide an apparatus for producing pieces of composite food each having a controlled composition of materials by eliminating pieces failing to meet composition requirements.

It is a further object of the present invention to provide an apparatus for producing composite food having a controlled composition of materials, which enables early discovery of poor products by continuously detecting quantities of supplied materials and calculating the ratio of each material of the composite food during the production of the food.

It is still another object of the present invention to provide an apparatus for producing composite food which enables the operator to stop the operation or comprises means to emit an alarm notifying the operator when poor products are produced.

In an aspect of the present invention an apparatus for producing composite food having a controlled composition of materials is provided, comprising
(a) a plurality of supply means for supplying a plurality of raw materials,
(b) conveyor means for receiving and transferring said raw materials provided from said supply means so as to combine them to produce composite food,
(c) a plurality of measuring means provided at said supply means for measuring quantities of said materials supplied from the respective supply means per unit time, and
(d) selecting means for selecting acceptable portions from the composite food by comparing a preselected control ratio value with the ratio of the quantities of said raw materials in a given portion of the composite food calculated form the quantities of the respective portions of the raw materials measured by said measuring means.

According to the present invention, quantities of individual food materials supplied from a hopper, an extruder, or other supply means are sequentially and independently measured per unit time and recorded in a time chart, until the materials are combined into a composite food mass and processed into individual pieces of composite food. Since the materials are supplied onto a conveyor assembly one after another, and combined and formed into a composite food mass while being conveyed by the conveyor assembly, the quantity of each material in each portion of the composite food conveyed per unit time is calculated by the quantity data in the time chart. The quantities of the materials in each composite food portion are then used to calculate the ratios of the combined materials of each portion. The ratios are compared with control ratios to determine whether the portion satisfies a required condition. Since the composition of the materials of each portion is checked against the control data, portions which do not satisfy the condition can be eliminated when the composite food mass is cut into products consisting of such portions. As a result, composite food having a controlled composition of materials can be obtained.

Moreover, when occurrence of such a poor portion is detected during the production of the food, the position and number of the poor product containing it can be detected during the process of production, so that it can be readily identified, and the damage caused by poor products can be minimized.

Further, upon completion of the production the total amount of each of the individual materials used, the total number of acceptable products, and the times at which such materials are provided and combined, can be immediately reported, and, also, how and under what conditions the poor products were produced, can be traced.

In the present invention, the quantity ratio amount of the components of the composite material is measured, without analyzing the individual products, by dividing them into separate components, and final unit products are accompanied by the measured weight and ratio data in reference to the time.

Thus, the position of a poor product can be located by detecting the time when it is produced, and the poor products can thus be removed, and thus only acceptable products will be shipped.

DESCRIPTION OF THE PREFERRED EMBODIMENT

Figure 1:
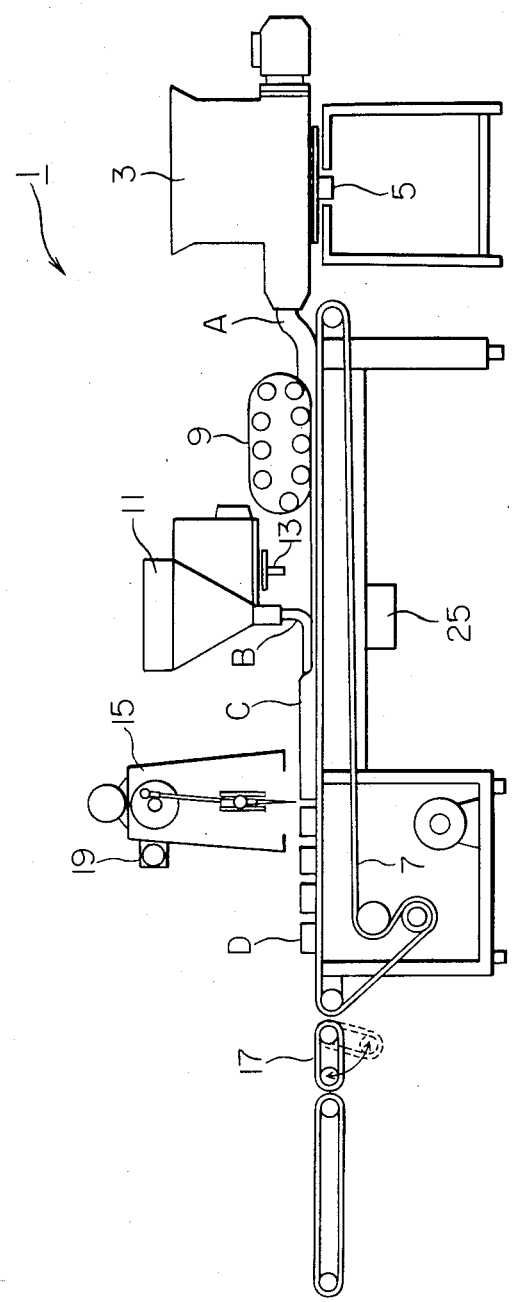
FIG. 1 shows an embodiment of the apparatus for producing the composite food of the present invention.

A preferable embodiment of the present invention will now be described by reference to the accompanying drawings. In FIG. 1, a composite food producing apparatus (1) of a preferable embodiment of the present invention is shown. In this apparatus (1), a first extruder (3) continuously supplying food material A, a first measuring means (5) provided at the extruder for measuring changes per unit time in the weight of the extruder (3) or the weight of the food material in the extruder (3), a conveyor (7) conveying food materials, a shaping device (9) continuously shaping and stretching material A into a desired form, a second extruder (11) supplying material B, and a second measuring means (13) provided at the second extruder (11) measuring changes per unit time in the weight of the second extruder (11) or the weight of the food material in the second extruder (11), are provided. The conveyor (7) is a conventional endless belt device and receives material A and material B on its upper run one after another so as to be combined into a composite food mass C. The shaping device (9) is a roller mechanism positioned above the conveyor (7) comprising a plurality of rollers rotatable about their axes and movable in unison in the same direction along an endless roller path in the same direction of the movement of material A, and is designed to shape material A into a desired form by pressing it to the upper run of the conveyor (7) and stretching it.

The apparatus (1) also comprises a cutter device (15) cutting the composite food mass C, and a selecting of the materials A and B, into separate products D, and a selecting device (17) selecting and eliminating poor products from the products D. The cutter device (15) comprises an adjusting means (19) to actuate the cutter device (15) to cut a composite food mass C into products D so that the product has a selected length in the direction of movement of the conveyor. The length of the product may preferably be the length at which the food materials progress on the conveyor per unit time of measurement of weight or a multiple of such a length. Since the conveyor (7) continuously conveys the composite food mass C, the time interval after which it is required to cut the composite food mass is calculated based on the speed of the conveyor (7) and the length of product D in the direction of movement of the conveyor. Then, the adjusting means (19) emits a signal to actuate the cutter device (15) at every such time interval so that the portions having the selected length can be cut from the composite food mass, resulting in products D. Such a time period, and the time the cutting is actuated, are recorded in a recording means (27) of a control unit (25).

Figure 2:
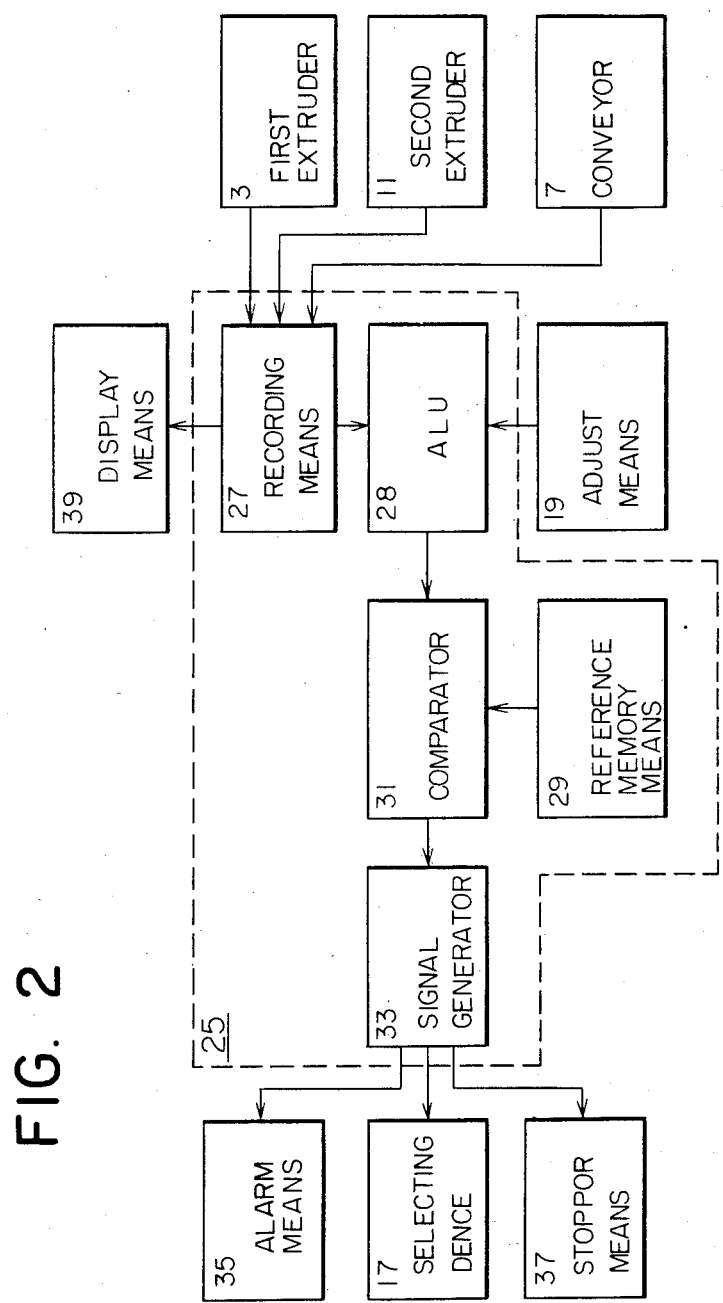
FIG. 2 is a block diagram showing the control unit (25) communicating with the other members of the apparatus in FIG. 1.

The control unit (25) is shown in FIG. 2. The control unit (25) comprises a recording means (27), ALU (28), a reference memory means (29), a comparator (31) and a signal generator (33). The weight values measured by the first and second measuring means (5, 13) are transmitted to the control unit (25). Since material A and B are received on the conveyor (7) one after another and combined while traveling, the weight for material A is delayed by the travel time for material A to reach a point close to the nozzle of the second extruder (11) so that the weight measurements for the materials combined in a given portion of the composite food mass can be synchronized. To compute the travel time, the control unit (25) receives the data indicating the conveyor moving speed from the conveyor (7). Then, the weight measurements for the materials A and B are summed and the ratio as well as the total weight of materials A and B are calculated in the ALU (28) and the thus obtained data is put in the recording means (27).

The weight measurements are also transferred and recorded in the recording means (27). The recording means (27) comprises any type of permanent memory means. For a visual check by an operator, the recording means (27) is connected to a display means (39) such as a video display unit (VDU) or graph indicator to display the changes in the weight measurement, the composite ratio, and the total weight of the materials. Therefore, an operator can detect trouble in supplying materials by watching the display means, which displays the contents of the recording means, and can detect the locations of the products and the times at which the products are produced.

Since the composite ratio and total weight data of each portion of the composite food mass C being conveyed is calculated and stored in the recording means (27), every portion in the composite food mass C has a composite ratio data as well as the total weight. Then, when the portions of the mass C is cut into product D, the portions included in each product D have their own composite ratios and total weight data respectively. In other words, the recording means (27) of the control unit (25) stores the composite ratio and the total weight of materials A and B per unit time corresponding to each portion so that the ratio and weight of the materials in each portion of the finished composite products D can be obtained from the recording means (27). The control unit (25) also comprises a reference memory means (29) which stores a reference composite ratio and total weight value indicating an acceptable composition and weight of each portion included in product D. In the comparator (31) of the control unit (25), the calculated ratio of the weight measurements and the total weight of materials A and B supplied per unit time in a portion of the composite food mass C is compared with the reference ratio value and the total weight value. Based on the comparison, the signal generator (33) of the control unit (25) generates a signal instructing an alarm means (35 of FIG. 2) to ring or display the status to notify an operator or send a signal to a stopper (37) means to stop the operation of the apparatus when the computed ratio does not meet the reference value. The signal generator (33) also generates a signal to actuate the selecting device (17). Since the composite ratio and total weight data of each portion is compared with the reference ratio and total weight to determine whether the portion has an acceptable composition of materials, the selecting device (17) can eliminate poor products, including a portion, or portions, which does not meet the reference values. The selecting device (17) comprises a small conveyor serially arranged downstream of the conveyor (7). The downstream end of the small conveyor is lowered in response to a signal fromm the signal generator (33) of the control unit (25) so as to eliminate poor products when they arrive on the small conveyor.

The operation performed by the apparatus (1) will now be described in detail. First, materials A and B are supplied into the hoppers of the first extruder (3) and the second extruder (11), respectively. When material A is extruded from the nozzle of the extruder (3), the weight of the extruder (3) decreases. The weight of the extruder is measured continuously by the measuring device (5) and the weight data is transmitted to the control unit (25).

Figure 3:
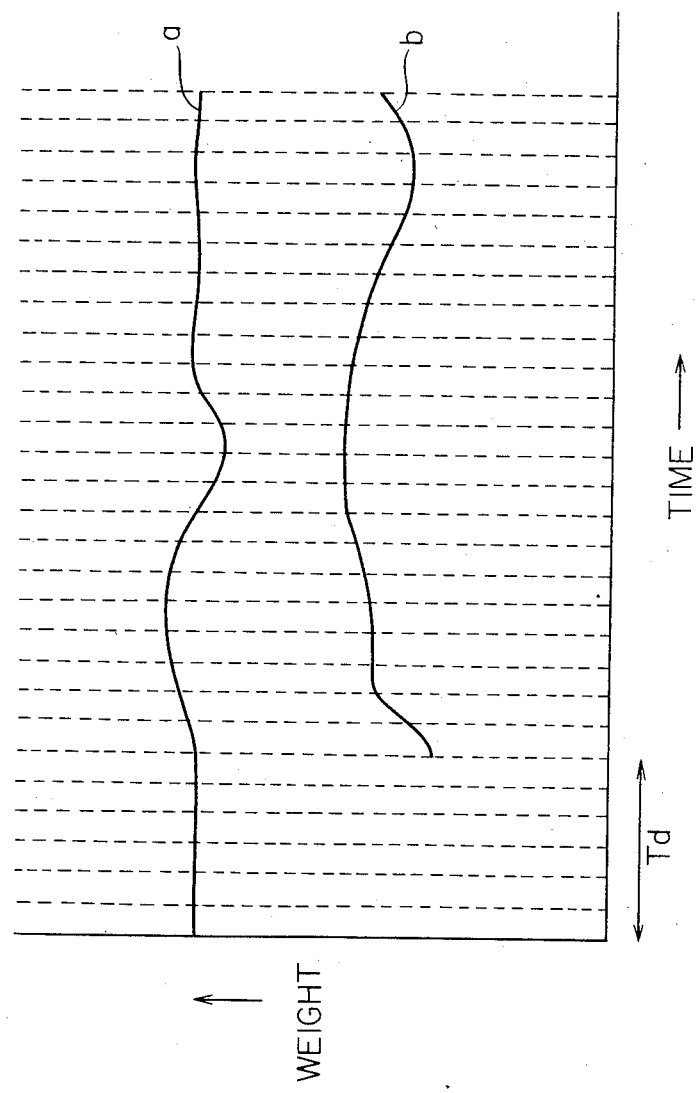
FIG. 3 is a graph showing the weight measurements relative to time of materials A and B provided from the extruders (3, 11).

In the ALU (28) of the control unit (25) the weight data is converted to data indicating the weight of material A extruded from the first extruder (3) per unit time. In FIG. 3, weight measurements of portions of materials A and B are shown in a time chart.

The curve a in the graph shows the weight of material A extruded from the extruder (3) for each unit time. Such unit time is described as a space between the dotted lines. Material A is conveyed by the conveyor (7) and, after being suitably shaped by the shaping device (9), combined with material B from the second extruder (11) to form a composite food mass C.

The weight of material B is continuously measured and converted into the weight data per unit time in the similar manner to obtain the weight data of material A.

In FIG. 3, the curve b shows the weight of material B from the second extruder (11) per unit time. It taken some time for material A to reach the position where it combines with B, and when A reaches the second extruder (11), the extruder begins to supply material B. Such a delay in time is described as $T_d$ in FIG. 3, and is determined by the moving speed of the conveyor (7) and the distance of the required travel. Due to such a delay, the ratio of the materials in a given portion of the composite food mass is described as a at $UT_d$: b at UT, wherein UT indicates a given unit time, $UT_d$ indicates a unit time which occurs before the given unit time by the delay time $T_d$. Therefore, the weight data for a portion of material A is delayed in the control unit (25) by the delay time $T_d$ and then put together with the weight data of material B to be combined with the above-said portion of material A so that the ratio and the total weight of material A and B in the relevant portion of the composite food mass C can be calculated. Such weight measurements, the times at which portions of materials are supplied, and the ratios and the total weight data, are stored in the recording means (27) of the control unit (25).

Figure 4:
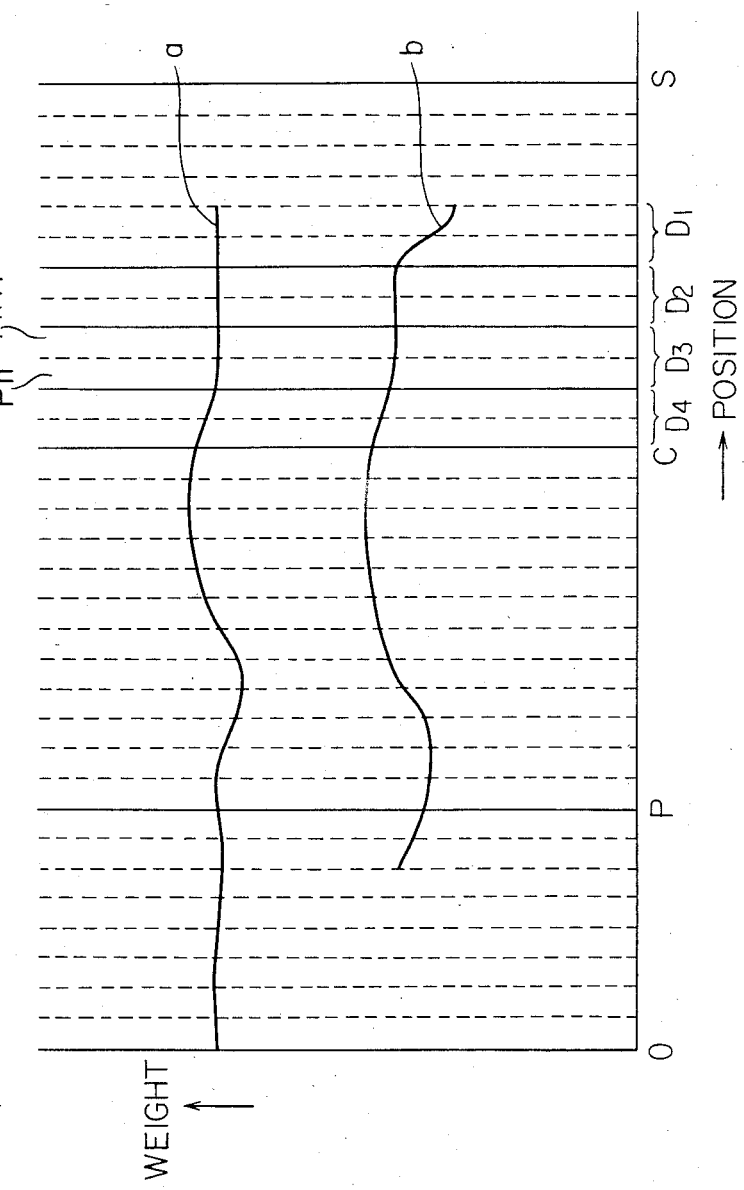
FIG. 4 is a graph showing the weight measurements of materials A and B relative to the position in the apparatus.

FIG. 4 shows the weight measurements of portions of materials A and B and their positions in the apparatus (1) when a fourth product $D_4$ is cut from the composite mass C. The leftmost ends of the curves a and b indicate the location of the first and second extruders (3, 11) respectively. The symbol P in the position axis indicates the position where materials A and B are combined and the symbol C indicates the position where the cutting operation takes place. As will be understood from FIG. 1, the position P is located near the nozzle of the second extruder (11) and the position C is at the cutter device (15), directly beneath its suspended knife. The solid lines to the right of the solid line C indicate the locations where the cutter operations had taken place and the portions of the composite mass are separated from each other. The symbol S in the position axis indicates the location where the selecting operation takes place.

In FIG. 4, the weight data for materials A and B in relevant portions of the composite food mass has been adjusted to appear in the same positional space the ratio is described as a:b at any position. The space between the dotted lines illustrates the length of the portions in the direction of movement of the conveyor, corresponding to the unit time in FIG. 3. For example, the third product $D_3$ includes two portions, the first at the ratio a:b at Pn and the second at the ratio a:b at Pn+1.

Suppose, for example, the product is an apple pie. In such a case, the ratio a:b represents the ratio between the quantities of the crust of the pie and the apple jam. In the case of foods, the weight ratio represents the taste, that is, the quality. In other words, the weight ratio of each portion indicates whether the quality of each of the separate products having the portion obtained by cutting is acceptable or poor.

Additionally, the total weight of materials A and B in the relevant portion is obtained by adding the weights of materials A and B. Such weight data of the portion also indicates the quality of the product. Therefore, such ratio and total weight value are compared with the reference ratio and the reference weight value stored in the reference memory (29) by the comparator (31), so that whether the portion is acceptable or poor can be determined. Then the composite food mass C is further carried by the conveyor (7) and cut by the cutter (15) into separate products D. The cutter device cuts the composite food mass into separate products by a periodic cutting operation in response to a signal from the adjusting means (19). Each time a product D is cut from the composite food mass C the time the cutting operation takes place is transmitted to and stored in the recording means (27) of the control unit (25). As described, the weight of each material per unit time and the time at which the weight is measured are stored in the recording means (27). Thus, the position of any portion of the composite food mass C at a certain time can be detected based on the moving speed of the conveyor (7). Therefore, the position of the poor portion that does not meet the condition provided by the reference data is detected. Further, by using the cutting time, the position of the portion where the cutting has taken place is detected. Based on the location of cutting and the location of the poor portion, the product having a poor portion is identified as a poor product and readily located in the apparatus. Therefore, when the poor product arrives on the small conveyor of the selecting means (17), the small conveyor can remove the poor product in response to a signal from the signal generator (33).

If the apparatus comprises an alarm means (35) such as an alarm lamp, a buzzer, an emergency display, etc., such means is activated by a signal from the signal generator (33) when the comparison indicates that the portion has a poor quality so that an operator is notified and can stop the operation of the apparatus.

Otherwise, if the apparatus comprises an interrupt means, such means is activated, upon receiving a signal indicating a portion of poor quality, to automatically stop the operation of the apparatus.

Because such weight data and cutting data in FIG. 4 is displayed by the display means (29) and updated each unit time, an operator can immediately detect any trouble in the production of the composite food and stop the operation before a large number of poor products are produced. Additionally, since the operator can check the time and position at which a poor product is produced, the reason for the trouble can be readily detected. Further, since each of the materials supplied is continuously measured, trouble in supplying can be detected even before the materials are combined, and thus production of poor products is predicted. Therefore, loss due to production of poor products can be minimized.

As described above, poor products are removed by the selecting device (17) leaving on the production line only the acceptable products having the substantially same quality.

Figure 5:
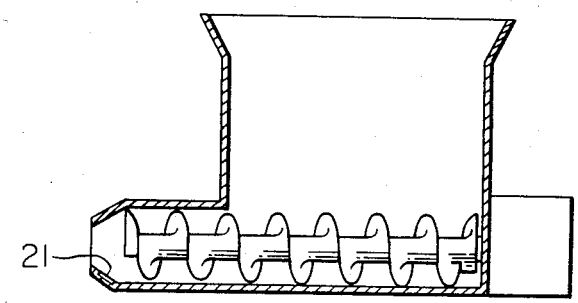
FIG. 5 and 6 shows other measuring means to measure a continuously supplied material.
Figure 6:
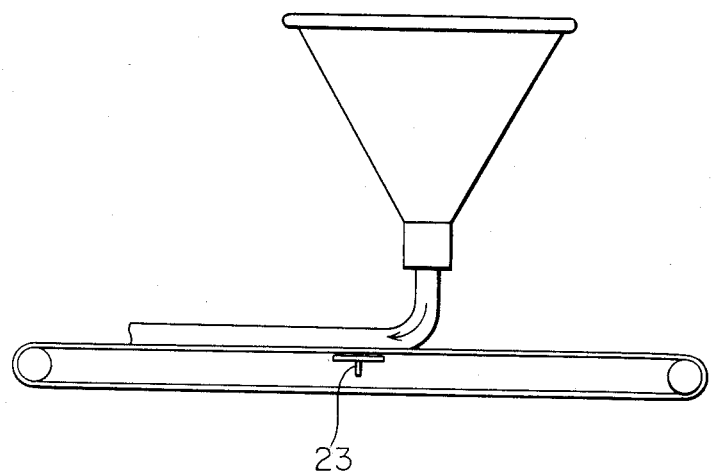

The method used for the time-based measurement of the quantities of the materials extruded from the first and second extruders (3, 11) is in no way limited to that described above. In a method shown in FIG. 5, a pressure sensor 21 measures the pressure acting on the inner surface of the nozzle of the extruder, and the measured pressure is multiplied by an experimentally established coefficient to obtain a quantity of a material supplied. Such data is transmitted to and stored in the memory of the control unit, registered against time. In another method shown in FIG. 6, a weight-measuring instrument 23 is disposed beneath the belt of the conveyor to record a timedependent change in the weight of the material being conveyed. In still another method, a sensor is disposed adjacent to the material extruder to measure the sectional area and extruding rate of the material extruded, and these values are used as data of the time-related quantities of the supplied material.

Figure 7:
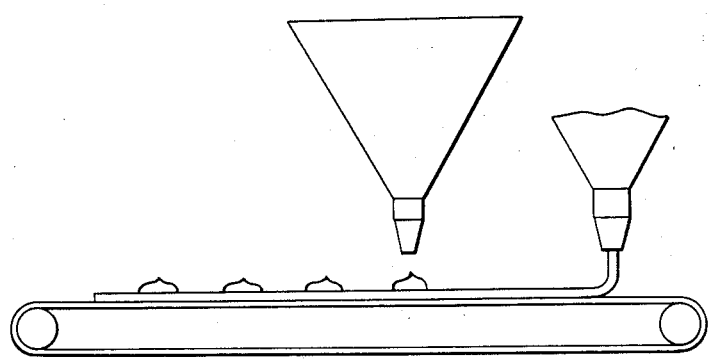
FIGS. 7, 8, and 9 show processes to produce the composite food of the present invention.
Figure 8:
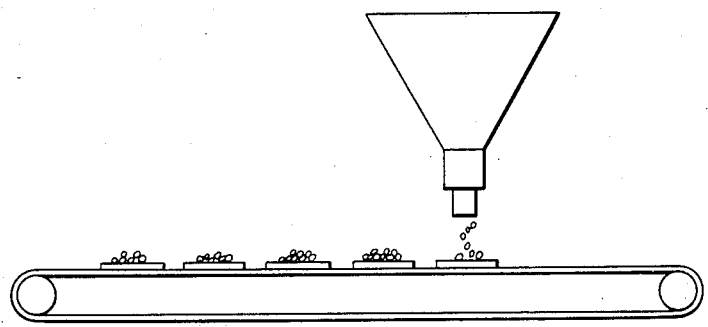
Figure 9:
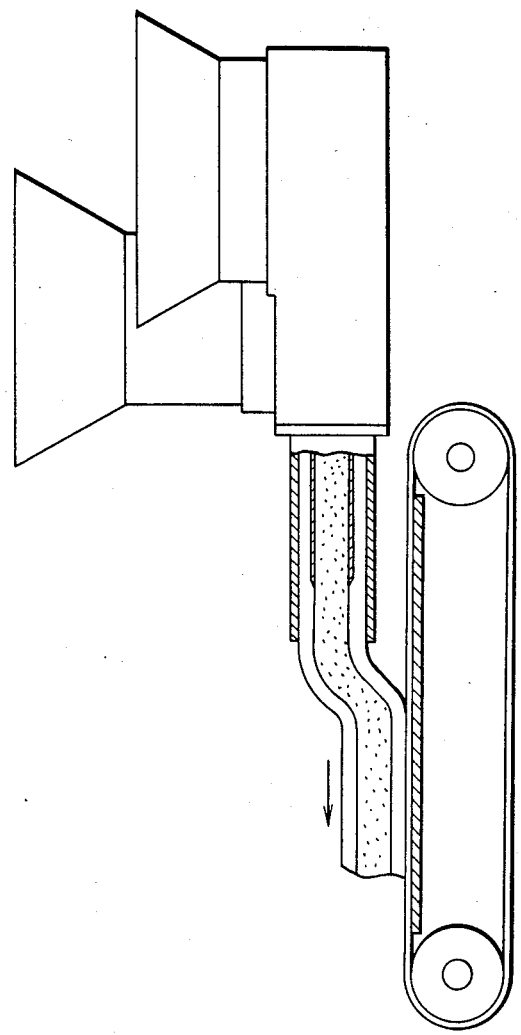

In the illustrated embodiment of the present invention, a plurality of various kinds of materials are combined in a strip form on a conveyor. However, the object of the present invention can also be attained by an intermittent supply of materials as shown in FIG. 7, and granular or pellet-like materials as shown in FIG. 8, or combining the supply of materials through a double pipe shown in FIG. 9.

As described above, the present invention controls the quality or taste of the composite food products, by a very simple method, during a process for continuous production of a composite food. A food material having a peculiar viscosity or elasticity, or a granular or pellet-like food material, will not be uniformly supplied from the extruder due to a bridging phenomenon or other problems, and a poor product may occur during production of products including such a material.

The apparatus of the present invention enables early discovery of such a poor product and can eliminate it, producing only a product having a composition within a standard range. Therefore, composite food products with substantially the same quality can be produced.

I claim:

1. An apparatus for producing composite food having a controlled composition of materials, comprising:
   (a) a plurality of supply means for supplying a plurality of raw materials,
   (b) conveyor means for receiving and transferring said raw materials provided from said supply means so as to combine said raw materials into a composite food,
   (c) a measuring means provided at each supply means for measuring the weight of said raw materials supplied from each supply means per unit time, and
   (d) control means operating a selecting means for selecting acceptable portions of said composite food by said control means comparing a preselected control weight ratio value of said raw materials with the weight ratio of said raw materials in a given portion of said composite food, said weight ratio in said given portion of said composite food calculated from the weight of said raw materials measured by said measuring means.

2. The apparatus of claim 1, wherein said control means further comprises means for comparing a preselected control weight of said raw materials in an acceptable given portion with the total weight of the raw materials in a given portion as measured by said measuring means and wherein said selecting means eliminates a given portion of unacceptable weight.

3. The apparatus of claim 1 wherein said selecting means comprises means for stopping the operation of the apparatus depending on the result of said comparison.

4. The apparatus of claim 1, 2 or 3, further comprising a cutter means for cutting said portions from said composite food into separate products.

5. The apparatus of claim 4, wherein said selecting means comprises means for removing poor products having an improper weight ratio value of said raw materials from said separate products depending on the results of said comparison.

6. The apparatus of claim 1, or 2, wherein said selecting means comprises alarm means for notifying an operator of an unacceptable weight ratio of said raw materials of said portions depending on the result of said comparison.

7. The apparatus of claim 1, or 2, wherein said measuring means comprises a weight device.

8. The apparatus of claim 1, or 2, wherein said measuring means comprises a pressure sensor.

9. The apparatus of claim 1 or 2 further comprising shaping means for shaping raw materials to be combined into said composite food.

10. The apparatus of claim 2 wherein said selecting means comprises means for stopping the operation of the apparatus depending on the result of said weight ratio comparison or said weight comparison.

* * * * *